United States Patent [19]

Yoshimura et al.

[11] Patent Number: 5,482,319
[45] Date of Patent: Jan. 9, 1996

[54] PASSENGER PROTECTION DEVICE FOR AN AUTOMOTIVE VEHICLE

[75] Inventors: Toshiteru Yoshimura; Katsutoshi Nakamura, both of Hiroshima, Japan

[73] Assignee: Mazda Motor Corporation, Hiroshima, Japan

[21] Appl. No.: 166,630

[22] Filed: Dec. 15, 1993

[30] Foreign Application Priority Data

Dec. 15, 1992 [JP] Japan .................................. 4-354554

[51] Int. Cl.$^6$ .................................................. B60R 21/02
[52] U.S. Cl. .................................................. 280/752
[58] Field of Search .................................. 280/748, 751, 280/752, 732, 731

[56] References Cited

U.S. PATENT DOCUMENTS

| | | | |
|---|---|---|---|
| 4,767,153 | 8/1988 | Kawasaki et al. | 280/752 |
| 4,978,136 | 12/1990 | Tomita et al. | 280/751 |
| 5,037,130 | 8/1991 | Okuyama | 280/752 |
| 5,071,162 | 12/1991 | Takagawa | 280/752 |
| 5,190,314 | 3/1993 | Takasugi | 280/732 |

FOREIGN PATENT DOCUMENTS

0378314  7/1990  European Pat. Off. ............... 280/732

*Primary Examiner*—Kenneth R. Rice
*Assistant Examiner*—Paul N. Dickson
*Attorney, Agent, or Firm*—Keck, Mahin & Cate

[57] ABSTRACT

A passenger protection device of an automotive vehicle which includes a steering support member for supporting a steering column and extending in the transverse direction of the vehicle in an instrument panel. A knee protector is disposed in the instrument panel corresponding to a position of the knees of the passenger. The knee protector has a receiving portion for receiving an impact from the knees of a passenger sitting on a front passenger seat. A deformable portion deforms when the receiving portion receives the impact from the knees of the passenger. Equipment is installed in the instrument panel in front of the knee protector, and a restricting member is provided on the steering support member and disposed between the equipment and the knee protector for restricting movement of the equipment backwardly.

12 Claims, 7 Drawing Sheets

PASSENGER PROTECTION DEVICE FOR AN AUTOMOTIVE VEHICLE

BACKGROUND OF THE INVENTION

1. Field of the Invention

The present invention relates to a passenger protection device for an automotive vehicle and, more particularly, to a passenger protection device which is installed in an instrument panel or a dashboard to protect knees of an occupant of a passenger seat of a front passenger compartment during a collision of the automotive vehicle when the knees of the occupant contact with the instrument panel or the dashboard.

2. Description of the Related Art

In general, an automotive vehicle has a knee protector, a seat belt and an air bag device for protecting the passenger of the vehicle during a collision of the automotive vehicle.

Figure 8:
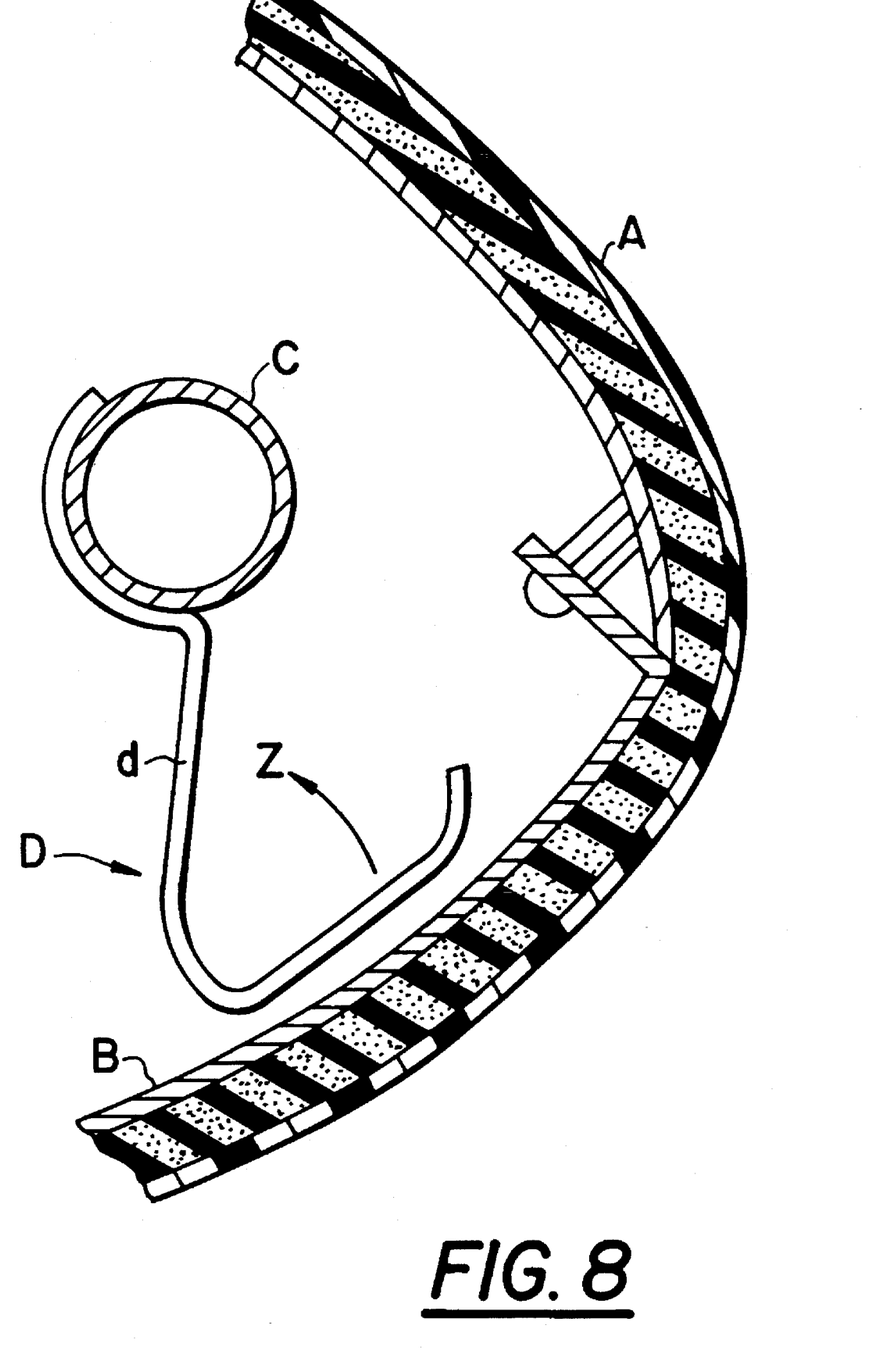
FIG. 8 is a cross sectional view of the knee protector in the instrument panel in accordance with a prior art.

For example, Japanese Unexamined laid-open Utility Model application 4-24852 discloses that the knee protector device D, shown in FIG. 8, comprises a core B positioned at a lower position of the instrument panel A, corresponding to the position of the knees of the passenger. A steering support member C installed for supporting a steering shaft (not shown) lies within the instrument panel A and extends in the transverse direction of the vehicle. A pair of knee protector members d and d are fixed to the steering support member C as shown in FIG. 8.

Further, the core B is harder than the other portion of the instrument panel A for absorbing energy from impact of the knees of the passenger.

According to the above related art, as a pair of knee protector members d and d of the knee protector device D are deformed in the direction of arrow Z when receiving the impact energy from the knees of the passenger by way of the hard core B of the instrument panel during the collision of the vehicle. The knee protector D can protect the knees of the passenger.

On the other hand, a lot of other equipment including a blow unit, a cooler unit, a heater unit, and engine control equipment etc. are installed in the instrument panel A.

In this case, in general, each of these units is disposed relative to a dash lower panel extending in the transverse direction of the vehicle body, and which is disposed in front of and into the instrument panel. Sometimes the above units are disposed adjacent to the steering support member C and the knee protector members d and d in the instrument panel A.

In other words, the space available for deforming the knee protector members d and d is decreased by movement of the above units backwardly of the vehicle body upon impact.

Therefore, in this case, it is necessary to provide a sufficiently large space between the knee protector members and the equipment, which can function as a space for absorbing the impact energy from the knee of the passenger even if the equipment upon impact moves into this space and reduces this space.

However, lately, the automotive vehicle has a lot of equipment placed in the instrument panel to provide various functions to the passenger. Therefore, it is not easy to design a compatible, compact layout of the instrument panel and at the same time provide a secure safety structure of the instrument panel.

Thus, a problem still exists to provide a passenger protection device including the knee protector members, which isn't restricted during deforming of the knee protector members even if there are some units adjacent to the knee protector in the instrument panel.

SUMMARY OF THE INVENTION

It is a first object of the present invention to provide a passenger protection device which is able to achieve the function of a knee protector certainly even if there are units mounted adjacent to the knee protector in the instrument panel.

The first object is accomplished by providing a passenger protection device for an automotive vehicle which comprises:

a steering support member for supporting a steering column and extending in the transverse direction of the vehicle in an instrument panel;

a knee protector disposed in the instrument panel corresponding to a position of the knees of a passenger, which has a receiving portion for receiving an impact from the knees of a passenger sitting on a front passenger seat, and a deformable portion for deforming when the receiving portion receives an impact from the knees of the passenger;

an equipment installed in the instrument panel and in front of the knee protector; and a restricting member mounted on the steering support member and disposed between equipment and the knee protector for restricting movement of the equipment backwardly.

A second aspect of the invention is characterized by providing equipment disposed at a dash panel which divides an engine room compartment from a passenger room compartment.

A third aspect of the invention is characterized by providing such equipment as an air conditioner unit of the passenger room compartment.

A fourth aspect of the invention is characterized by providing a knee protector comprising a pair of knee protector members which are connected to the steering support member; and a restricting member extending in the transverse direction of the vehicle body.

A fifth aspect of the invention is characterized by providing that each end portion of the restricting member has fixed thereon a pair of the knee protector members, respectively.

A sixth aspect of the invention is characterized by providing one end portion of the knee protector member fixed to the steering support member with the other end portion serving as the receiving portion, and a portion disposed between the both ends serving as the deformable portion.

A seventh aspect of the invention is characterized by providing that the fixed portion of the restricting member to the knee protector is disposed in front of the deformable portion of the knee protector and is located under the steering support member.

According to the above aspects of the invention, the novel passenger protection device is able to prevent movement of the equipment in the instrument panel backwardly of the vehicle even if an engine, transmission or other equipment of the engine room compartment is moved backwardly of the vehicle during a collision of the automotive vehicle.

Especially, according to the fourth and seventh aspects of the invention, the restricting member is disposed in front of the knee protector and a space is provided to allow adequate deforming and movement of the knee protector. Therefore, the passenger protection device of the present invention is able to prevent an entry of equipment into this space which is formed between the knee protector members, and to divide or isolate an impact to the equipment from the knee protector members.

BRIEF DESCRIPTION OF THE DRAWINGS

The above objects and features of the present invention will be apparent to those skilled in the art from the following description of the preferred embodiments hereof when considered in conjunction with the appended drawings in which.

DETAILED DESCRIPTION OF THE PREFERRED EMBODIMENT(S)

The invention will now be described in detail with reference to the drawings.

Figure 1:
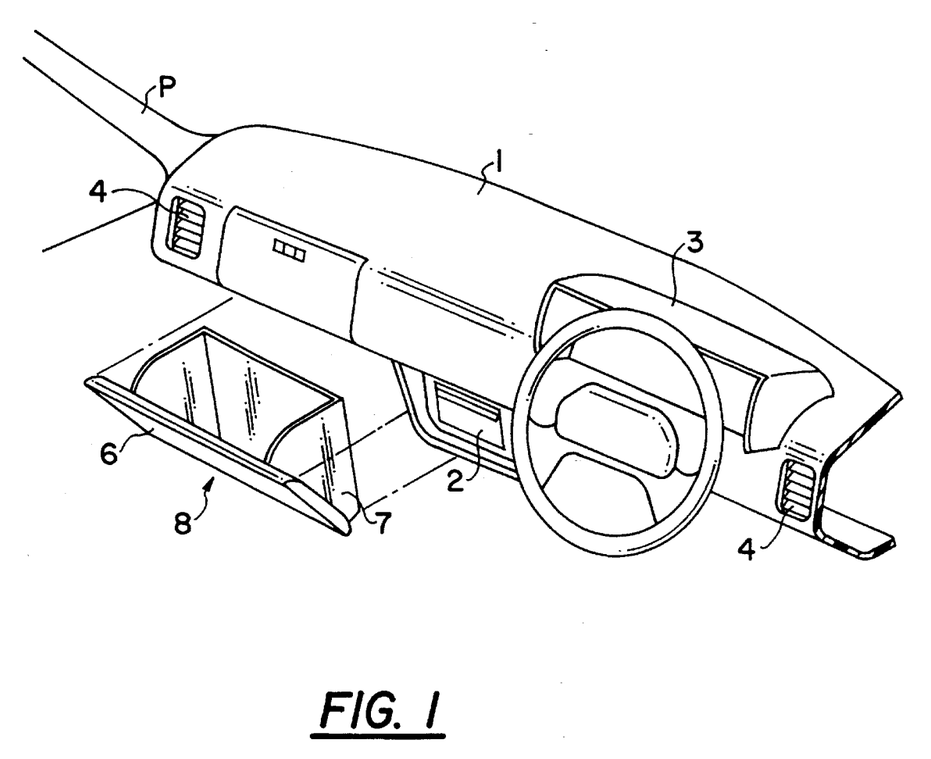
FIG. 1 is a perspective view of an instrument panel in accordance with a first embodiment of the present invention.

As shown in FIG. 1, an instrument panel 1 is installed in an automotive vehicle at the front of a passenger room compartment. Installed in panel 1 is audio equipment 2, a meter hood portion 3 within which are installed meters and dials including a vehicle speed meter. Air outlets 4 and 4 are disposed at right and left sides of the instrument panel 1 for blowing air into the passenger room compartment.

The instrument panel 1 has an opening 5 which is positioned opposite the front passenger seat side and a lower position for attaching a glove box which comprises a lid 6 and a casing 7 for receiving small articles. The lower portion is pivotally assembled to the instrument panel 1 by way of a hinge 9.

The attachment position of the glove box 8 to the instrument panel is at the same elevation as the position of a passenger's knee X sitting in the front passenger seat. The casing 7 of the glove box 8 is made of plastic and is thin.

Figure 2:
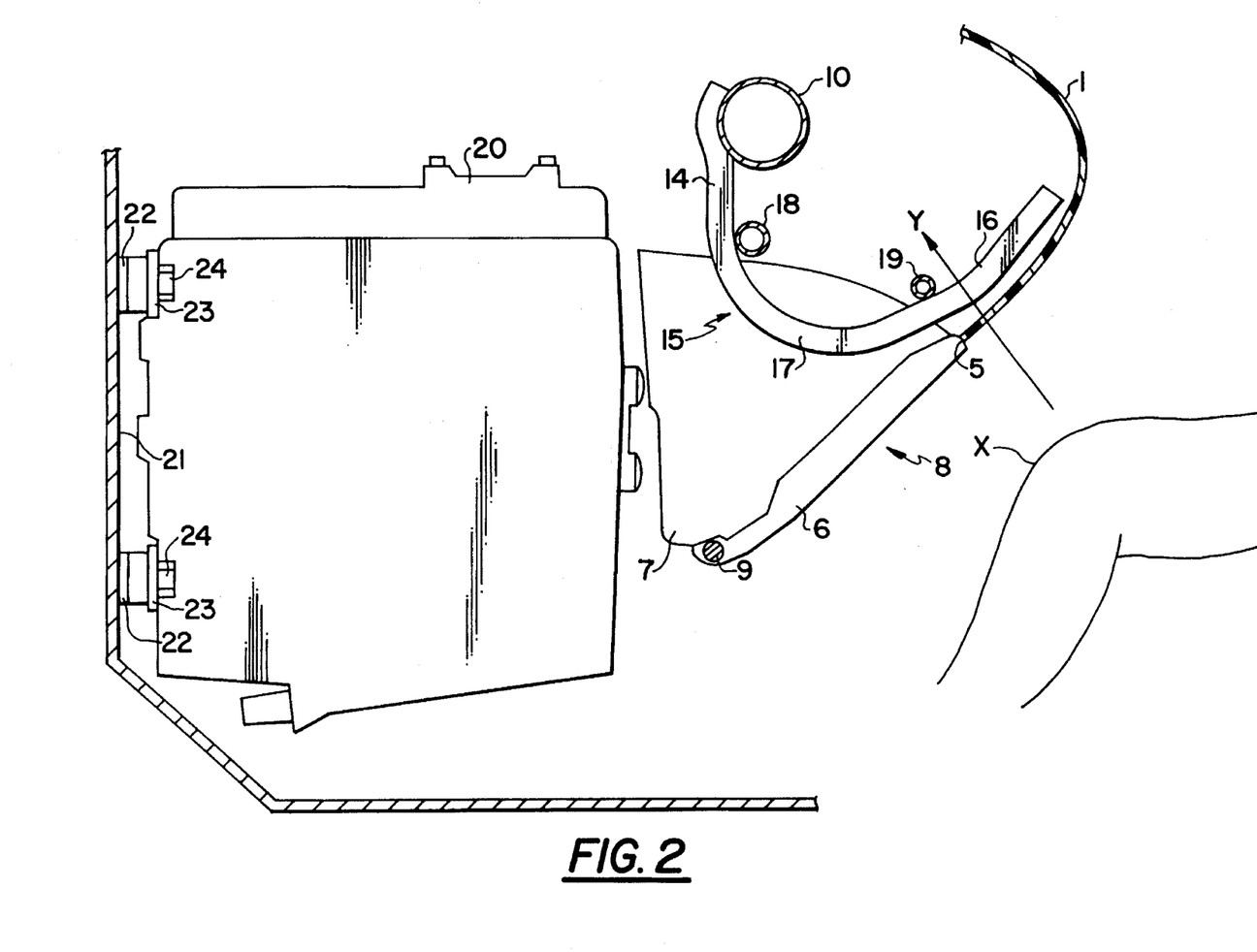
FIG. 2 is a cross sectional view of a knee protector in the instrument panel in accordance with the first embodiment of the present invention.
Figure 4:
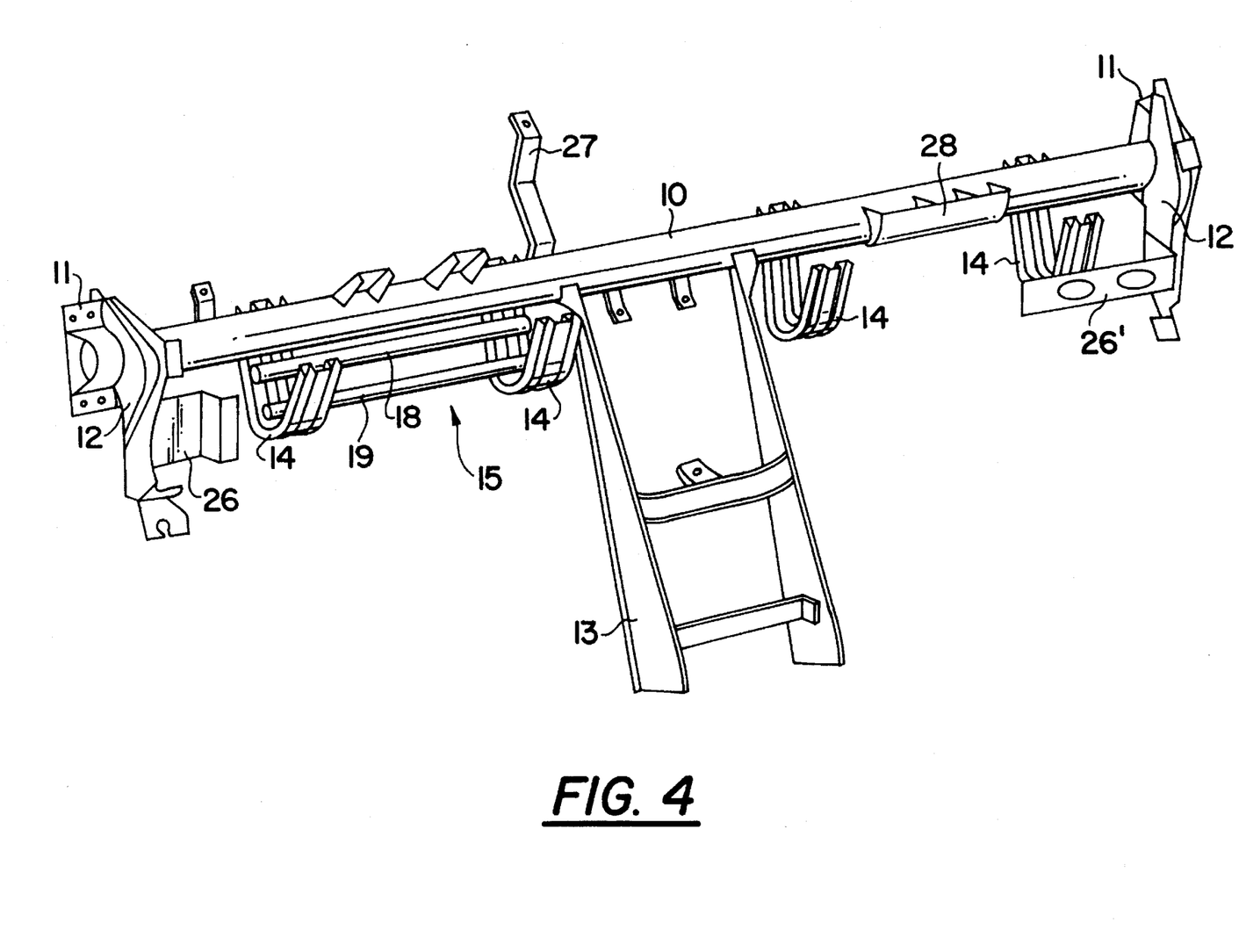
FIG. 4 is a perspective view of a steering support member in accordance with the first embodiment of the present invention.

A steering support member 10 which is disposed into the instrument panel 1 as shown in FIG. 2 extends in the transverse direction of the vehicle body and supports a steering column (not shown) by way of a bracket 28 fixed to the steering support member 10. Each end of the steering support member 10 has a side bracket member 12 which has a fixed portion 11 which are connected with a pillar P as shown in FIG. 4. The steering support member 10 is connected to a cowl panel (not shown) of the vehicle body by way of a bracket 27 extending forwardly from the middle portion of the steering support member 10, and which is disposed above a dash panel of the vehicle body (not shown).

A middle position of the steering support member 10 is connected with a tunnel portion (not shown) of an underfloor of the vehicle body by way of a center member 13 comprising right and left members extending vertically. One end of the center member 13 is connected with the middle portion of the steering support member 10 and the other end is connected with the tunnel portion of the underfloor of the vehicle body.

Further, the steering support member 10 has mounted on it a knee protector 15 comprising a pair of knee protector members 14 and 14 for protecting the knees of the passenger sitting on front passenger seats.

The knee protector member 14 has a U shaped form as shown in FIG. 2, and is composed of pressed or stamped profiles or parts of a metal thin plate, and extends from the steering support member 10 toward the knees of the passenger. In the manner described, one end of each knee protector member 14 is connected with the steering support member 10 and the other end extends toward the knees of the passenger.

The end of the knee protector member 14 is fixed to the steering support member 10 by using welding, and the other end 16 is formed as a receiving or impact portion for the knees of the passenger in the event of a collision and a middle deformable portion 17 between both of the ends, has a function for absorbing impact energy from the knees of the passenger when the automotive vehicle is in a collision.

Further, the protector members 14 extend downwardly from the fixed point of the steering support member 10 and also from the casing 7 of the glove box 8 which is disposed between a pair of the knee protector members 14 and 14, and overlies especially the energy absorbing portions 17 and 17 of members 14.

When the automotive vehicle experiences a collision, the knee of the passenger tends to move in the direction of arrow Y from its normal at rest position, see FIG. 2. Therefore, the receiving end portions 16 of the protector member 14 which are disposed at a higher elevation, receive the effect of the impact by the knees.

Figure 3:
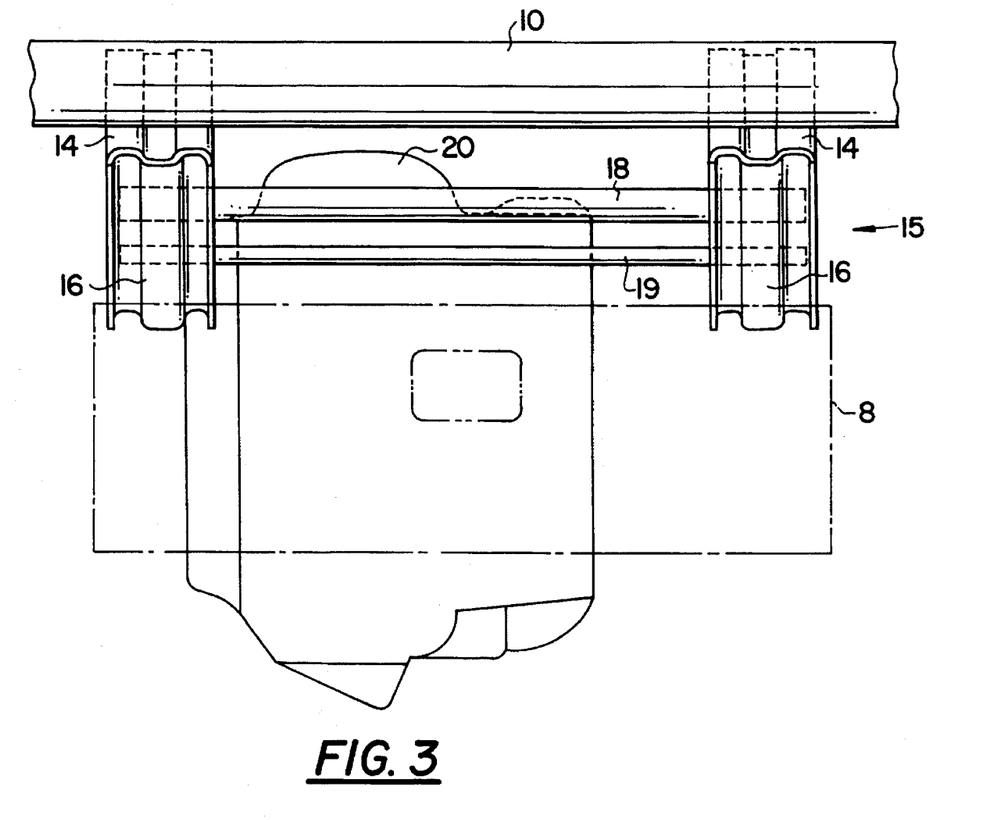
FIG. 3 is a front view of the knee protector in accordance with the first embodiment of the present invention.

A movement preventing member 18 made of a hollow metal pipe, which is disposed and fixed between the both of the sides and ends of the knee protector members 14 and 14 prevents backward movement of an air conditioner or other unit installed in the instrument panel 1 lower than the steering support member 10.

A connection member 19 made of a hollow metal pipe, which is disposed between the other ends or sides of the knee protector members 14 and 14, scatters or diffuses an impact load from the knee of the passenger to right and left protector members 14 and 14.

In the instrument panel 1, an evaporator 20 for controlling the air conditioning in the passenger room compartment, is disposed in front of the steering support member 10 and the knee protector 15. The evaporator 20 is fixed to a dash lower panel 21 extending vertically between the passenger room compartment and an engine room compartment (not shown). The evaporator 20 is fixed to brackets 22 of the dash lower panel 21 by way of brackets 23 of the evaporator 20 by using bolts 24.

Figure 7:
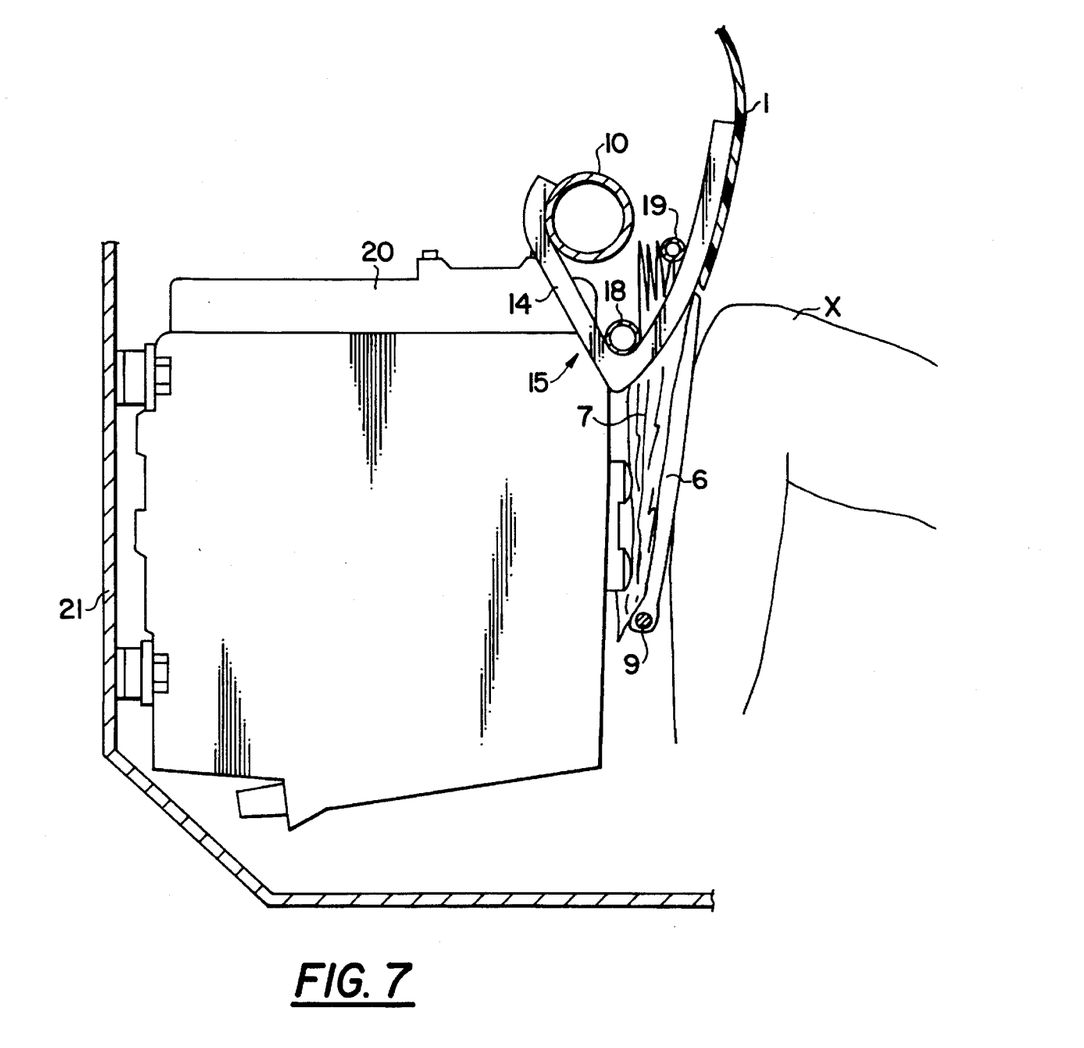
FIG. 7 is a cross sectional view of the knee protector in the instrument panel in accordance with the first embodiment of the present invention after the knee protector has been acted on during a collision.

The operation of the first embodiment will now be described in detail with reference to FIG. 7. When the automotive vehicle experiences a collision, at first, equipment installed in the engine room compartment, for example, an engine unit (not shown) tends to move backwardly of the vehicle body, then the evaporator 20 tends to move backwardly of the vehicle body. These first movements hereinafter are referred to as a movement by a first collision. After that, as a reaction to the movement by the first collision, the knees X of the passenger sitting in the front seat of the vehicle move in the direction of arrow Y, see FIG. 2, and the knees X contact the lid 6 of the glove box 8. These movements hereinafter are referred to as a movement by a secondary collision. At this time, the glove box 8 is pivoted counterclockwise on the hinge 9 by the movement of the knees X and the impact energy from the knees X is transmitted to receiving portions 16 and 16 by way of the lid 6 of the glove box 8. As a result, the energy absorbing portions 17 and 17 buckle or are deformed, as shown in FIG. 7, to absorb the energy from the knees of the passenger.

In this case, there is a possibility that the casing 7 contacts the evaporator 20. However, this casing 7 is crashed easily as the casing 7 is made of the thin plastic plate as above explained. Therefore, the casing 7 is not an obstacle to movement of the evaporator 20. Casing 7 can also absorb energy from the knee as a deformable article.

On the other hand, in this embodiment, the evaporator 20 is disposed adjacent to the knee protector 15. Therefore, the evaporator 20 tends to move backwardly of the vehicle body during the first collision when the dash lower panel 21 moves backwardly. However, in this embodiment, there is the movement preventing member 18 positioned under the steering support member 10 and between both of the knee protector members 14 and 14 for preventing the movement backwardly of the evaporator 20. Member 18 serves to maintain the space between the knee protector members 14 and 14 to allow sufficient movement of portions 17 to absorb the energy from the knees X.

In other words, prior to the secondary collision, the movement preventing member 18 contacts the evaporator 20 and after that, prevents further movement of the evaporator 20 at the first collision while maintaining the space between the protector members 14 and 14.

Therefore, the impact load from the knees X is received by the knee protector members 14 and 14 by way of the lid 6, and the impact load transferred to the knee protector members 14 and 14 is transferred to the front pillar P and the floor panel connected with the pillar P by way of the steering support member 10.

On the other hand, similarly, when the evaporator 20 contacts the movement preventing member 18, a load transferred to the movement preventing member 18 from the evaporator 20 is transferred to the front pillar P and the floor panel by way of each of the protector members 14 and 14 and the steering support member 10. The above embodiment has a pair of the knee protector members 14 and 14 corresponding to the front seat passenger. Therefore, the impact energy from the evaporator 20 can be divided between the two knee protector members 14 and 14.

Accordingly, prior to contacting the knees X of the passenger to the knee protector members 14 and 14 (the movement of the secondary collision), the novel structure is able to prevent premature deformation of the knee protector members 14 and 14, and to maintain the space for absorbing the impact energy from the knees X of the passenger.

Further, in this embodiment, a pair of knee protector members 14 and 14 correspond with the driver sitting in the driver's seat, but this pair of members 14 do not have a movement preventing member 18 and a connecting member 19.

Furthermore, the steering support member 10 has a knee protector 26' which extends transversely and inside of the passenger room compartment from the side bracket 12 corresponding to the knee of the driver sitting in the driver's seat, and a knee protector 26 for absorbing the energy from the knee of the passenger sitting on the passenger seat when the passenger receives an impact resulting from a front and an oblique of the vehicle body.

Figure 5:
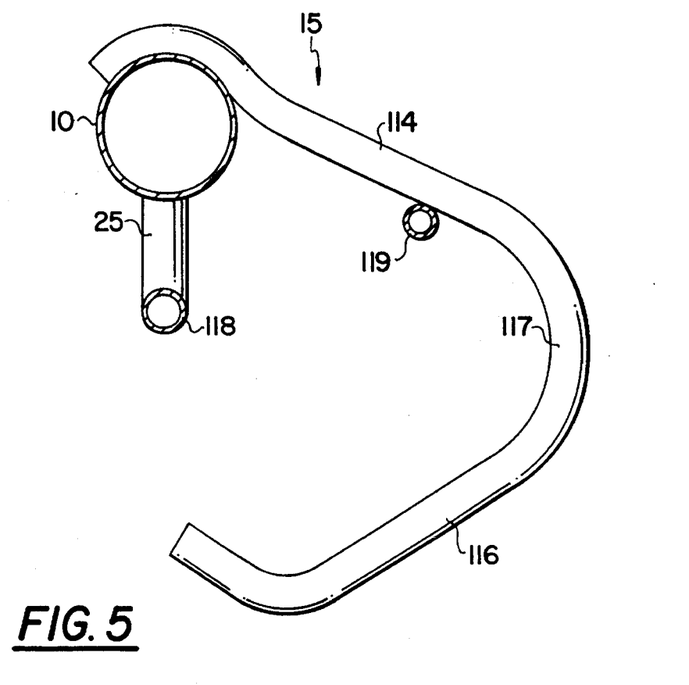
FIG. 5 is a cross sectional view of the knee protector in the instrument panel in accordance with the second embodiment of the present invention.
Figure 6:
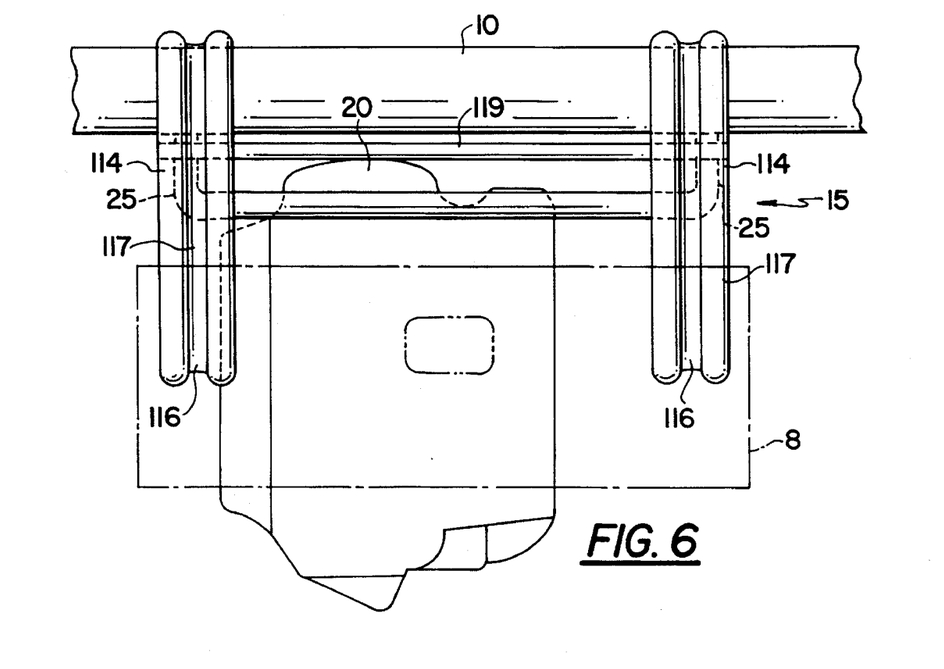
FIG. 6 is a front view of the knee protector in accordance with the second embodiment of the present invention.

FIGS. 5 and 6 show a second embodiment of the invention and similar parts have been labeled with the same reference numerals and a detailed explanation of these elements has been omitted for brevity of description.

The knee protector 15 comprises a pair of knee protector members 114 and 114 each of which has a portion extending backwardly and downwardly of the vehicle from a fixed portion to the steering support member 10, a bending portion 117 for absorbing the energy from the knee of the passenger and a knee receiving portion 116 extending downwardly and frontwardly from the bending portion 117 for receiving the energy from the knee by way of the lid (not shown) of the glove box.

A connection member 119 disposed above and in front of the bending portion 117 extends in the transverse direction of the vehicle body and the ends of the member 119 are connected to the right and left knee protector members 114 and 114. In the second embodiment, a movement preventing member 118 is disposed under the steering support member 10 and is fixed to the steering support member 10 by way of a pair of brackets 25 extending downwardly from the steering support member 10, thereby hanging the movement preventing member 118 to and below the steering support member 10.

Further, the movement preventing member 118 is disposed behind the evaporator (not shown) and in front of the knee protector 15 for preventing the backward movement of the evaporator and maintaining a space between the knee protector members 114 and 114 prior to the secondary collision.

Although the present invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What is claimed is:

1. A passenger protection device for an automotive vehicle comprising:

a steering support member for supporting a steering column and extending transversely of the vehicle in front of an instrument panel;

a pair of knee protector members, disposed in front of the instrument panel in positions corresponding to positions of knees of a passenger sitting on a front passenger seat, each of said knee protector members being connected to said steering support member, having a U shaped form, and having a receiving portion for receiving an impact from one of the knees of the passenger and a deformable portion for deforming when the receiving portion receives an impact from said one of the knees of the passenger;

equipment installed in front of the instrument panel and in front of the knee protector members; and a movement restricting member mounted on the steering support member, positioned in front of said deformable portion of each of the knee protector members, and disposed between the equipment and the knee protector members for restricting movement of the equipment backwardly of the vehicle during a collision.

2. A passenger protection device according to claim 1, wherein the equipment is disposed behind and fixed to a dash panel dividing an engine room compartment from a passenger room compartment.

3. A passenger protection device according to claim 1, wherein the equipment is an air conditioner unit.

4. A passenger protection device according to claim 1, wherein the movement restricting member extends transversely of the vehicle.

5. A passenger protection device according to claim 4, wherein said movement restricting member has a pair of end portions and each end portion of the movement restricting member is fixed to one of the pair of knee protector members.

6. A passenger protection device according to claim 5, wherein each of the knee protector members has opposite end portions, one of the opposite end portions of each of the knee protector members is fixed to the steering support member, the other of the opposite end portions of each of the knee protector members defines the receiving portion, and an intermediate portion of each of the knee protector members disposed between the opposite end portions defines the deformable portion.

7. A passenger protection device according to claim 5, wherein each end portion of the movement restricting member is disposed in front of the deformable portion of one of the knee protector members and under the steering support member.

8. A passenger protection device according to claim 4, and further comprising a glove box, having a lid and a casing, disposed in a space which is formed between said knee protector members, the receiving portion of each of the knee protector members being disposed along and in front of the lid of the glove box.

9. A passenger protection device according to claim 1, and further comprising a bracket fixing each of a pair of opposite ends of said movement restricting member to said steering support member, wherein the movement restricting member extends transversely of the vehicle.

10. A passenger protection device according to claim 9, wherein the bracket extends downwardly from the steering support member.

11. A passenger protection device according to claim 10, wherein each of the knee protector members has opposite end portions, one of the opposite end portions of each of the knee protector members is fixed to the steering support member, the other of the opposite end portions of each of the knee protector members defines the receiving portion, and a portion of each of the knee protector members between the opposite end portions defines the deformable portion.

12. A passenger protection device according to claim 9, and further comprising a glove box, having a lid and a casing, disposed in a space which is formed between said knee protector members, the receiving portion of each of the knee protectors being disposed along and in front of the lid of the glove box.

* * * * *